United States Patent
Wetjens et al.

(10) Patent No.: US 9,428,662 B2
(45) Date of Patent: Aug. 30, 2016

(54) HOT MELT INK

(71) Applicant: OCE-TECHNOLOGIES B.V., Venlo (NL)

(72) Inventors: Peter M. A. Wetjens, Venlo (NL); Kim C. Jansen, Venlo (NL); Robin X. E. Willemse, Venlo (NL); Jacobus G. Van Enckevort, Venlo (NL)

(73) Assignee: OCE-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 15/087,122

(22) Filed: Mar. 31, 2016

(65) Prior Publication Data

US 2016/0215155 A1    Jul. 28, 2016

Related U.S. Application Data

(63) Continuation of application No. PCT/EP2014/071554, filed on Oct. 8, 2014.

(30) Foreign Application Priority Data

Oct. 11, 2013  (EP) .................................... 13188355

(51) Int. Cl.
| | | |
|---|---|---|
| *C09D 11/34* | (2014.01) | |
| *C09D 11/328* | (2014.01) | |
| *C09D 11/38* | (2014.01) | |
| *C09B 5/14* | (2006.01) | |

(52) U.S. Cl.
CPC .............. *C09D 11/34* (2013.01); *C09D 11/328* (2013.01); *C09D 11/38* (2013.01)

(58) Field of Classification Search
CPC ..... C09D 11/34; C09D 11/328; C09D 11/38; C09B 5/14

USPC ........................................... 106/31.29, 31.47
See application file for complete search history.

(56) References Cited

U.S. PATENT DOCUMENTS

| | | | | |
|---|---|---|---|---|
| 6,015,847 A | * | 1/2000 | Titterington | C09D 11/34 106/31.29 |
| 6,530,985 B1 | * | 3/2003 | Matsumoto | C09B 5/14 106/31.47 |
| 6,682,587 B2 | * | 1/2004 | Hendricks | C09D 11/34 106/31.29 |
| 6,811,596 B1 | * | 11/2004 | Bedford | C09D 11/34 106/31.29 |
| 7,981,203 B2 | | 7/2011 | Suilen et al. | |
| 2004/0102540 A1 | * | 5/2004 | Jaeger | C09D 11/34 523/160 |
| 2006/0021546 A1 | * | 2/2006 | Wu | C09D 11/34 106/31.29 |
| 2006/0032397 A1 | | 2/2006 | Banning et al. | |
| 2008/0064875 A1 | | 3/2008 | Banning et al. | |
| 2008/0187664 A1 | * | 8/2008 | Banning | C09D 11/34 106/31.29 |
| 2008/0187665 A1 | * | 8/2008 | Banning | C09D 11/34 106/31.29 |

OTHER PUBLICATIONS

International Search Report issued in PCT/EP2014/071554, dated Dec. 19, 2014.
Written Opinion of the International Searching Authority issued in PCT/EP2014/071554, dated Dec. 19, 2014.

* cited by examiner

*Primary Examiner* — Helene Klemanski
(74) *Attorney, Agent, or Firm* — Birch, Stewart, Kolasch & Birch, LLP

(57) ABSTRACT

Disclosed is a hot melt ink composition containing a substantially non-aqueous carrier composition; at least one dye which comprises at least one salt of the anthrapyridone series; and an organic sulfonic acid compound. Also disclosed is a method of preparing the hot melt ink composition.

16 Claims, No Drawings

HOT MELT INK

CROSS REFERENCE TO RELATED APPLICATIONS

This application is a Continuation of PCT International Application No. PCT/EP2014/071554, filed on Oct. 8, 2014, which claims priority under 35 U.S.C. 119(a) to patent application Ser. No. 13/188,355.5, filed in Europe on Oct. 11, 2013, all of which are hereby expressly incorporated by reference into the present application.

FIELD OF THE INVENTION

The invention relates to an ink composition which is solid at room temperature and liquid at a higher temperature, comprising a substantially non-aqueous carrier composition and at least one dye which comprises at least one salt of the anthrapyridone series.

BACKGROUND ART

An ink composition of this kind, which is also known as a hot melt ink, is known from U.S. Pat. No. 7,981,203. This patent describes a hot melt ink to be applied in ink jet printing devices, comprising a non-aqueous carrier, and at least one dye of which comprises at least one salt of the anthrapyridone series, in particularly the triphenylmethylphosphonium (TMP) salt of C.I Acid Red 143 and 143:1 are disclosed in said patent.

It is a disadvantage of the ink composition disclosed in U.S. Pat. No. 7,981,203 that if alkali metal ions and/or alkaline earth metal ions are present in the ink composition e.g. due to natural occurrence in raw materials, such metal ions may precipitate in the nozzles of the print head as an alkali metal salt or alkaline earth metal salt of the chromophores C.I. Acid Red 143 and 143:1. Examples thereof are magnesium and/or calcium salts of the above disclosed chromophores, in particular calcium salts thereof. Such nozzle depositions may cause jet angle defects and print quality problems (e.g. white stripes on prints).

In general, the above disadvantage relates to hot melt ink compositions comprising a salt of the anthrapyridone series as a dye, if at least one alkali metal cation or alkaline earth metal cation present in the ink composition has a stronger interaction with the chromophore anion than the cation that was originally associated with the dye anion. In such cases ion exchange of the cation associated with the chromophore anion occurs, possibly leading to nozzle depositions as explained above.

It is another disadvantage of the ink compositions disclosed in U.S. Pat. No. 7,981,203 that the solubility of such dyes in the ink compositions tends to be low, which may lead to crystallization of the dye at the desired concentration level of the dye in the ink composition. Dye crystals may cause filter and nozzle clogging.

The disadvantages particularly hold for ink compositions comprising magenta dyes.

It is therefore an object of the present invention to provide a hot melt ink composition which obviates or at least mitigates the above-described disadvantages.

SUMMARY OF THE INVENTION

To this end, an ink composition according to the preamble has been invented wherein the ink composition comprises an organic sulfonic acid compound.

The salt of the anthrapyridone is considered as a chemical modification of an anthrapyridone dye known from the Color Index (C.I.). For example, the salt of the ink composition comprises an anion of a known anthrapyridone dye, and a suitable cation bonded to the anion to counteract dye migration. In this context it is mentioned that a substantially non-aqueous carrier means a carrier which is not substantially based on water (acting as vehicle). The non-aqueous carrier preferably comprises less than 15 mass percent of water, more preferably less than 10 mass percent of water, even more preferably less than 5 mass percent of water, and most preferably less than 2 mass percent of water

DETAILED DESCRIPTION

It has surprisingly been found that with an ink according to the present invention the stability of the salt (acting as a derivative dye) of an anthrapyridone, in particular a magenta anthrapyridone, can be improved. Ink compositions of this kind are soluble in the carrier composition at the desired toning level and do not form nozzle depositions.

Without wanting to be bound to any theory, it is thought that the alkali metal ions and/or alkaline earth metal ions that are present in the ink composition preferentially bind to the sulfonic acid to form a sulfonate salt. This mechanism prevents the alkali metal ions and/or alkaline earth metal ions from binding to the chromophore anions. Hence nozzle depositions of alkali metal salts and/or alkaline earth metal salts, in particular the calcium salt of the chromophore, can be prevented or at least mitigated.

Sulfonic Acid Additive

In an embodiment, the organic sulfonic acid compound comprises an aromatic organic sulfonic acid compound.

In an embodiment, the organic sulfonic acid compound satisfies the following formula:

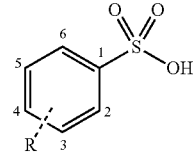

Formula 1 wherein

R is an alkyl group having between 1 and 20 carbon atoms which alkyl group is optionally branched and optionally substituted with hetero atoms or groups containing hetero atoms.

In an embodiment, the organic sulfonic acid compound is a benzene sulfonic acid compound, selected from the group consisting of para-toluene-sulfonic acid and dodecylbenzenesulfonic acid.

In an embodiment, the organic sulfonic acid compound is present in an amount of between 0.01 weight % and 10 weight %, preferably between 0.05 weight % and 5 weight %, more preferably between 0.1 weight % and 1 weight %, relative to the total ink composition.

Chromophore Salts Used as Dyes in Ink Compositions According to the Present Invention.

In an embodiment the chromophore salt comprises at least one phosphonium group and/or at least one ammonium group. The application of one or more phosphonium groups and/or one or more ammonium groups is considered to be advantageous, since these groups will provide the salt with relatively good thermo stability. The phosphonium group and/or the ammonium group will commonly make part of a cation of the salt bond to the anionic anthrapyridone. Moreover, the use of a phosphonium salt will commonly not lead to an observable emission of odors.

In an embodiment, the salt comprises a cation derived from the group consisting of triphenylmethylphosphonium bromide, N-methyl-N,N-dioctyl-1-octanaminium chloride, tetrabutylphosphonium bromide, Primene™ 81-R (a primary aliphatic amine available at Rohm and Haas, USA), 1,3 di-o-tolylguanidine, butyltriphenylphosphonium chloride, ethyltriphenylphosphonium bromide, tributyloctylphosphonium bromide, tetrabutylammonium bromide, tetrapentylammonium bromide, and tripentylamine.

It has further been found that it is advantageous to force a chemical reaction between an anthrapyridone and a cationic triphenylmethylphosphonium (TMP) bromide available from Aldrich. This reaction will commonly have a relatively high yield. Moreover, this reaction can be initiated relatively easily. During the reaction between the anthrapyridone molecule and at least one triphenylmethylphosphonium bromide molecule, at least one ion (depending on the type of anthrapyridone used, for example a $Na^+$ ion or a $H^+$ ion) will be removed from the anthrapyridone molecule, and a bromide ion ($Br^-$) will be removed from each triphenylmethylphosphonium bromide molecule. The salt obtained thus comprises anionic anthrapyridone and cationic triphenylmethylphosphonium (TMP).

In an embodiment, and in order to facilitate the formation of the salt, the anthrapyridone (used as starting material to form the salt) comprises at least one sulfonic acid group and/or a derivate thereof. Sulfonic acid groups and derivates thereof are commonly relatively reactive which facilitates the chemical modification of the anthrapyridone considerably. Moreover, the application of one or more sulfonic groups and derivates thereof will commonly lead to a relatively thermo-stable dye.

In an embodiment, an anthrapyridone to prepare the colored salt for an ink composition according to the invention can be represented by Formula 2:

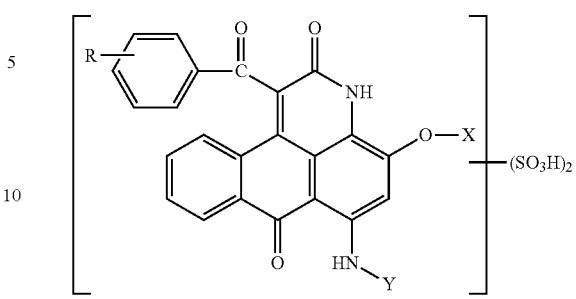

Formula 2 wherein X stands for a member selected from the group consisting of phenyl, alkylphenyl and cycloalkylphenyl groups, Y stands for a member selected from the group consisting of phenyl, alkylphenyl, phenoxyphenyl, chlorophenyl, bromophenyl, diphenyl and tetrahydronaphtyl radicals, and R is a member selected from the group consisting of hydrogen, methyl, chloride, bromide, methoxy and nitro. An advantage of the use of such an anthrapyridone molecule to prepare the colored salt is that the salt to be obtained will commonly have a relatively good and durable color-resistance.

In an embodiment, the dye of the ink composition according to the invention comprises a salt represented by Formula 3:

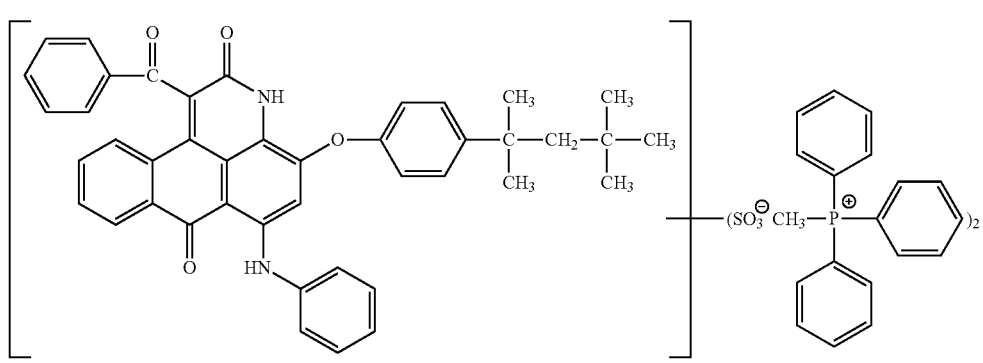

Formula 3

The salt represented above comprises an anionic magenta anthrapyridone, in particular C.I. Acid Red 143:1, and cationic TMP. C.I. Acid Red 143:1 is available from Nippon Kayaku, Tokyo, Japan. This product is considered as being relatively pure, wherein practically every molecule comprises two sulfonic acid groups.

In an embodiment, the dye comprises a salt represented by Formula 4:

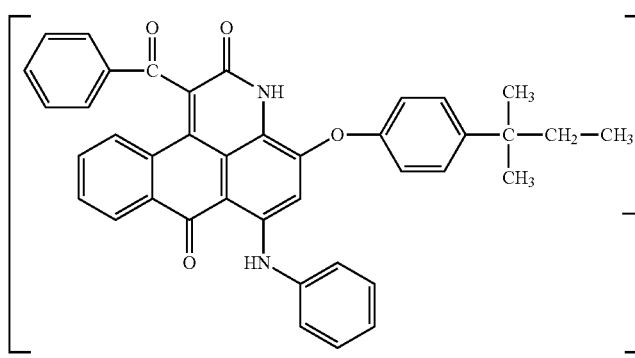 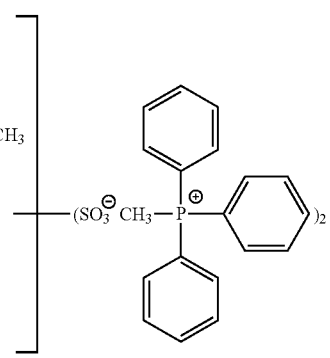

Formula 4

The salt represented above comprises an anionic magenta anthrapyridone, in particular C.I. Acid Red 143, and cationic TMP. C.I. Acid Red 143 is available from Clariant AG, Basel, Switzerland. Although this product is considered as being less pure than C.I Acid Red 143:1, still a satisfying and relatively stable salt can be obtained with this compound.

In another aspect, the present invention relates to a method for preparing an ink composition which ink is solid at room temperature and liquid at a higher temperature, the ink comprising a substantially non-aqueous carrier composition and at least one dye which comprises at least one salt of the anthrapyridone series and an organic sulfonic acid compound, the method comprising the steps of:
- providing the non-aqueous carrier composition, the dye and the organic sulfonic acid compound;
- heating the non-aqueous carrier composition, the dye and the organic sulfonic acid compound to an elevated temperature, until the non-aqueous carrier composition has melted and the dye and the organic sulfonic acid compound have dissolved in the non-aqueous carrier composition;
- stirring the non-aqueous carrier composition, the dye and the organic sulfonic acid compound at the elevated temperature until a homogeneous mixture is obtained.

The method can be performed with raw materials as obtained from a supplier, or with an existing hot melt ink composition comprising a dye which comprises at least one salt of the anthrapyridone series and adding the organic sulfonic acid compound to the molten ink composition.

In an embodiment, the method according to the present invention further comprises the step of:
- filtering the obtained liquid mixture over a filter having a pore size of between 100 nm and 500 nm, preferably between 150 nm and 300 nm, more preferably between 200 nm and 250 nm.

With this additional step the formed alkali metal salts and/or alkaline earth metal salts of the organic sulfonic acid, in particular the calcium salt of the organic sulfonic acid, can be removed in order to further reduce the risk of nozzle clogging. Small particles of the alkali metal salts and/or alkaline earth metal salts of the organic sulfonic acid present in the ink composition may readily form a layer on the filter, i.e. a filter cake layer. The filter cake layer acts as a filter itself and may have pores that are smaller than the pores of the filter. The filter cake formation therefore enhances removal of alkali metal salts and/or alkaline earth metal salts of the organic sulfonic acid present in the ink composition. It is evident that in case of hot melt inks, the filtration step is performed at elevated temperature, at least at a temperature at which the ink carrier composition is in a molten state. This step is however optional, because the organic sulfonic acid precipitate can be jetted.

EXAMPLES

Materials

All chemicals were obtained from Sigma Aldrich, unless stated otherwise. The chemicals were used as received.
TonerPearls CW600 Magenta as used in the examples are obtained from Océ.

Experimental and Measurement Methods

Calcium Concentration
The calcium concentration in the hot melt samples was determined as follows:
- 2 grams of hot melt composition was dissolved in 6 ml of Chloroform (obtained from Sigma Aldrich), using polypropylene (PP) tubes and 1 ml of UHQ water was added;
- the two phases were mixed for 2 hours using a Multi-RS60 (BioSan);
- the tubes were centrifuged for 5 minutes using a Hermle Z323 centrifuge (5000 rpm) until a clear phase-separation was reached;
- the water phase was separated using a pipette and stored in 1.5 ml polypropylene vials;

The samples were analyzed using an Ion chromatograph system (ICS-5000 from the firm Dionex), equipped with a CG12a pre-column and CS12a main column. Detection is performed using a conductivity detector. Calibration of the system was carried out using a 6 cation standard available from Dionex.

Concentration PTSA
The concentration of para toluene sulfonic acid (PTSA) is determined by weighing the constituents of the hot melt composition before mixing them. The PTSA concentration in the context of the present invention has not been measured.

Drop Size/Jet Angle/Printer Test
The measurements were performed with a dedicated measuring tool, which includes a CCD camera.
Before starting the printer test, the print heads were tuned to a droplet speed of 6.0 m/s by adjusting the actuation pulse amplitude.
The printer test was performed with an Océ ColorWave 600 with the Océ ColorWave print head which were tuned as described above. The test was started after rinsing the print head with hot melt ink. During the test the printer was continuously printing or in standby/low power (without cooling down the print heads) by printing every 0.5-3 hours a small print.

The total ink usage was approximately 0.5 g/hour per color.

After the test the droplet size for each print head was measured after readjusting the jetting speed to 6.0 m/s (as mentioned before). At this speed the average droplet size [μm] for all nozzles was measured by weighing.

A known number of ink droplets were ejected and intercepted in a (pre-weighed) aluminum cup. By weighing the cup containing the ejected ink, the average weight of an ink droplet was calculated and with the mass density of the ink composition, the droplet volume was calculated.

The $\Delta d_{droplet}$=(droplet diameter at the beginning of the printer test)–(droplet diameter after # Warm Ours in the printer test).

Also the jet angle is measured and the average for that print head is mentioned. ($\sigma_{jetting\ angle}$=standard deviation of the jet angle perpendicular to the paper transport direction in the printer [°])

The invention will now be explained with reference to the following non-limitative examples.

Preparation of TMP Salt of C.I. Acid Red 143

200 g C.I. Acid Red 143 (available from Clariant, Basel, Switzerland, under the tradename Lanasyn Red F-5B) was dissolved about 2 L demineralized water at room temperature.

A solution of 135 g triphenylmethylphosphonium bromide in 400 ml demineralized water was prepared.

The latter solution was added drop wise to the C.I. Acid Red 143 solution while stirring. Subsequently, 2 L dichloromethane was added drop wise to the mixture while stirring. The mixture was then allowed to rest for about one hour to achieve a satisfying phase separation. After the phase separation of the two layers was complete, the top layer (aqueous layer) was removed.

The dichloromethane phase was rinsed at least two times, for example six times, each time with about 2 L of water to wash out generated ancillary salts.

After filtration of the dichloromethane phase, the dichloromethane phase was concentrated by evaporation at 45° C. The final rests of the solvent were evaporated in vacuum. The product formed by the method is the salt of triphenylmethylphosphonium and C.I. Acid Red 143.

Preparation of the Calcium Salt of C.I. Acid Red 143

200 g C.I. Acid Red 143 (available from Clariant, Basel, Switzerland, under the tradename Lanasyn Red F-5B) was dissolved in about 2 L demineralized water at room temperature. An excess amount of $Ca^{2+}$ ions was added to the obtained mixture by adding a suitable calcium salt, such as calcium lactate The mixture was then stirred for 24 hours and filtered. The residue was washed with water at least three times. The obtained salt (calcium chromophore salt) was finally dried.

Comparative Example A

Hot Melt Ink According to the Prior Art

A hot melt ink composition was prepared by preparing a carrier composition containing 65% by weight of the bis-ester formed from the reaction of 1,4-dimethanol trans-cyclohexane and 2 mol-equivalents of orthomethylbenzoic acid. This compound, also known as Cyclo-2T, is disclosed in EP 1 067 157 (Table 2, under D, compound 17). Alternatively, instead of using 65% of the above mentioned compound, inks can be formulated comprising 65% of the crystalline component according to formula II as mentioned in U.S. Pat. No. 6,682,587 (for example compound 8 as mentioned in table 3 of this '587 patent).

In addition, the carrier composition contained 35% by weight of an amorphous component which is a mixture of different compounds. This amorphous component can be obtained as explained in example 3 of U.S. Pat. No. 6,936,096.

The dye obtained as described above (the salt of TMP and C.I. Acid Red 143) was added in an amount of 4 g per 100 g of carrier composition. Inks obtained in this way appear to have a sparkling magenta color that will hardly show any visible migration of the coloring material when transferred to a plain paper receiving material. Even in case the receiving material is subsequently laminated with another layer, e.g. a transparent foil, the transferred image will substantially retain its sharpness and image quality.

Example 1

Calcium Content of Hot Melt Inks

Magenta CrystalPoint toner pills were obtained from Océ and used in the Experiments 1-3 of Example 1 as a raw material and as a reference material.

50 grams of magenta CrystalPoint toner pills (obtained from Océ, i.e. standard toner) were melted. 1000 ppm (50 mg.) of the calcium salt of C.I. Acid Red 143 prepared as described above and an amount of an additive, if any (see Table 1) was added to the molten hot melt composition. The mixtures were stirred for 4 hours at 130° C. and subsequently filtered over a 200 nm nylon filter. The calcium concentrations in the filtered toner compositions were measured.

TABLE 1

Hot melt compositions as used in and results of example 1

| | Additive | Amount (g) | Ca-content filtered toner (ppm) |
|---|---|---|---|
| Experiment 1 | — | — | 14.3 |
| Experiment 2 | PTSA monohydrate[1] | 0.78 (4.1 mmol) | 0.05 |
| Experiment 3 | 4-dodecylbenzenesulfonic acid | 1.18 (3.6 mmol) | 19.3 |

[1] Para Toluene Sulfonic Acid monohydrate

The standard Magenta crystal point toner pearls as used obtained from Océ contain approximately 0.3 ppm Calcium. By adding 1000 ppm of the Calcium salt of C.I. Acid Red 143, Calcium is added in an amount of between 25 and 50 ppm. Table 1 shows that after filtration of the hot melt ink composition 14.3 ppm of Calcium remains in the ink composition (experiment 1).

Table 1 also shows that by using 4-dodecylbenzenesulfonic acid (experiment 3), the removal of calcium is in the same order as when no additive is used. However, ink compositions according to these examples are still examples in accordance with the present invention, because the used additives preferentially bind to the calcium ions, in such a way that the risk of formation of precipitates of the calcium salt of the chromophore in the nozzles is significantly reduced.

Finally, Table 1 shows that by adding PTSA monohydrate, almost all calcium can be removed from the hot melt ink composition after filtering. This is probably due to filter cake formation, which forms a fine pore filter as explained above.

Because of a reduction of the calcium concentration in the hot melt ink composition, the solubility of the C.I. Acid Red 143 chromophore increases, which is confirmed by visual inspection of the crystallization behavior under a melt microscope.

Because crystallization of the chromophore has been reduced, the risks of filter and nozzle clogging have been significantly reduced.

Example 2

Jet Stability as a Function of Concentration PTSA in a Hot Melt Ink Composition in Accordance with the Present Invention 500 grams of magenta CrystalPoint toner pills (obtained from Océ, i.e. standard toner) were melted. An amount of PTSA monohydrate (see experiments 4-7 in Table 2) was added to the molten hot melt composition. The mixtures were stirred for 1 hour at 130° C. and toner pills were made with a suitable mold. The calcium concentration in the toner composition was 1 ppm in all cases (experiments 4-7), measured in accordance with the above disclosed measurement method.

A printer test was performed for 290 hours, in accordance with the above described method. After that the change in drop size ($\Delta d_{droplet}$) and the variation in jetting angle ($\sigma_{jetting\ angle}$) among all nozzles of the print head were determined as described above. Table 2 shows that with increasing PTSA concentration, the change in drop size and the change in jetting angle decreases, indicating more stable jetting behavior.

TABLE 2

Jetting stability of hot melt compositions comprising different PTSA concentrations

| | Concentration PTSA monohydrate (weight % relative to total composition) | $\Delta d_{droplet}$ (µm) | $\sigma_{jetting\ angle}$ (°) |
|---|---|---|---|
| Experiment 4 | 0.01 | 5.6 | 1.0 |
| Experiment 5 | 0.03 | 1.2 | 0.1 |
| Experiment 6 | 0.05 | 0.4 | 0.1 |
| Experiment 7 | 0.1 | 0.0 | 0.1 |

Without wanting to be bound to any theory it is believed that the calcium ions preferentially bind to the PTSA, in order to form calcium para toluene sulfonate. This prevents formation of calcium precipitates of the C.I. Acid Red 143 anion in the nozzles, which may impair stable jetting behavior. Table 2 shows that with increasing PTSA concentration there is less change in drop size and in jetting angle, indicating a more stable jetting behavior. It can be concluded that in this particular example at a PTSA monohydrate concentration of 0.1 weight % (i.e. experiment 7), there is no change in drop size after 290 hours of jetting and the standard deviation of the jetting angle is very small, indicating that after 290 hours of jetting, the print head still shows a stable jetting behavior with the ink composition in accordance with experiment 7.

The invention claimed is:
1. A hot melt ink composition, comprising:
a substantially non-aqueous carrier composition;
at least one dye which comprises at least one salt of the anthrapyridone series; and
an organic sulfonic acid compound.
2. The hot melt ink composition according to claim 1, wherein the organic sulfonic acid compound is an aromatic sulfonic acid compound.
3. The hot melt ink composition according to claim 1, wherein the organic sulfonic acid compound satisfies the following formula:

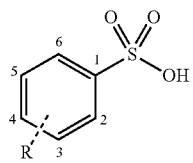

Formula 1 wherein
R is an alkyl group having between 1 and 20 carbon atoms which alkyl group is optionally branched and optionally substituted with hetero atoms or groups containing hetero atoms.

4. The hot melt ink composition according to claim 1, wherein the organic sulfonic acid compound is a benzene sulfonic acid compound selected from the group consisting of para-toluene-sulfonic acid and dodecylbenzenesulfonic acid.

5. The hot melt ink composition according to claim 1, wherein the organic sulfonic acid compound is present in an amount of between 0.01 weight % and 10 weight % relative to the total ink composition.

6. The hot melt ink composition according to claim 1, wherein the dye comprises a salt of a magenta anthrapyridone.

7. The hot melt ink composition according to claim 1, wherein the salt comprises at least one phosphonium group and/or at least one ammonium group.

8. The hot melt ink composition according to claim 1, wherein the salt comprises a cation selected from the group consisting of triphenylmethylphosphonium bromide, N-methyl-N,N-dioctyl-1-octanaminium chloride, tetrabutylphosphonium bromide, Primene™ 81-R, 1,3 di-o-tolylguanidine, butyltriphenylphosphonium chloride, ethyltriphenylphosphonium bromide, tributyloctylphosphonium, tetrabutylammonium bromide, tetrapentylammonium bromide, and tripentylamine.

9. The hot melt ink composition according to claim 1, wherein the salt of the anthrapyridone series comprises at least one sulfonic acid group and/or a derivate thereof.

10. The hot melt ink composition according to claim 9, wherein the anthrapyridone for preparing the salt is represented by the formula:

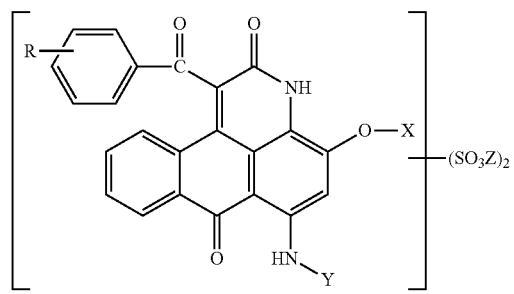

wherein X stands for a member selected from the group consisting of phenyl, alkylphenyl and cycloalkylphenyl groups, Y stands for a member selected from the group consisting of phenyl, alkylphenyl, phenoxyphenyl, chlorophenyl, bromophenyl, diphenyl and tetrahydronaphtyl radicals, Z stands for a positive counter ion, and R is a member selected from the group consisting of hydrogen, methyl, chloride, bromide, methoxy and nitro.

11. The hot melt ink composition according to claim 10, wherein the dye comprises a salt represented by the formula:

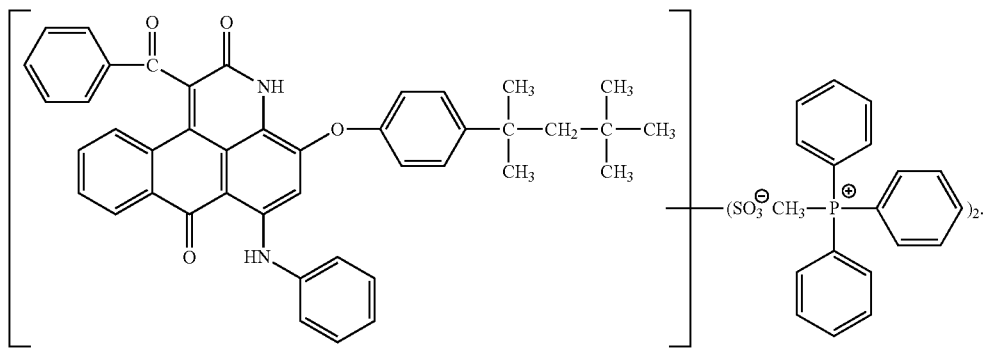

12. The hot melt ink composition according to claim 8, wherein the dye comprises a salt represented by the formula:

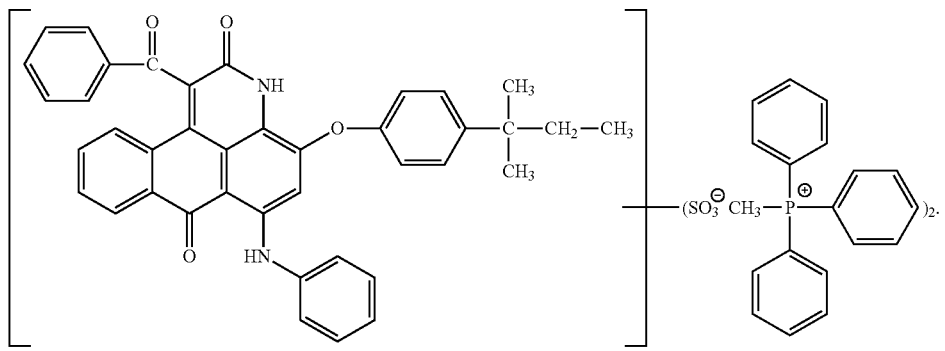

13. The hot melt ink composition according to claim 11, wherein the organic sulfonic acid is para-toluene sulfonic acid, which is present in an amount of between 0.01 weight % and 10 weight %, relative to the total ink composition.

14. A method for preparing a hot melt ink composition, the ink comprising a substantially non-aqueous carrier composition and at least one dye which comprises at least one salt of the anthrapyridone series and an organic sulfonic acid compound, the method comprising the steps of:
   providing the non-aqueous carrier composition, the dye and the organic sulfonic acid compound;
   heating the non-aqueous carrier composition, the dye and the organic sulfonic acid compound until the non-aqueous carrier composition has melted and the dye and the organic sulfonic acid compound have dissolved in the non-aqueous carrier composition;
   stirring the non-aqueous carrier composition, the dye and the organic sulfonic acid compound until a homogeneous mixture is obtained.

15. The method according to claim 14, wherein the method further comprises the step of:
   filtering the obtained liquid mixture over a filter having a pore size of between 100 nm and 500 nm.

16. The hot melt ink composition according to claim 12, wherein the organic sulfonic acid is para-toluene sulfonic acid, which is present in an amount of between 0.01 weight % and 10 weight %, relative to the total ink composition.

* * * * *